(12) United States Patent
Edge et al.

(10) Patent No.: US 8,631,354 B2
(45) Date of Patent: Jan. 14, 2014

(54) FOCAL-CONTROL USER INTERFACE

(75) Inventors: Darren K. Edge, Beijing (CN); Min Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 12/399,293

(22) Filed: Mar. 6, 2009

(65) Prior Publication Data

US 2010/0229130 A1  Sep. 9, 2010

(51) Int. Cl.
*G06F 3/033* (2013.01)
(52) U.S. Cl.
USPC .......................................... 715/863
(58) Field of Classification Search
USPC .......................................... 715/863
See application file for complete search history.

(56) References Cited

U.S. PATENT DOCUMENTS

| | | | |
|---|---|---|---|
| 5,227,771 A | 7/1993 | Kerr et al. | |
| 5,513,342 A | 4/1996 | Leong et al. | |
| 5,712,995 A | 1/1998 | Cohn | |
| 5,745,717 A | 4/1998 | Vayda et al. | |
| 5,771,042 A | 6/1998 | Santos-Gomez | |
| 5,844,547 A | 12/1998 | Minakuchi et al. | |
| 6,008,809 A | 12/1999 | Brooks | |
| 6,204,845 B1 | 3/2001 | Bates et al. | |
| 6,567,102 B2 | 5/2003 | Kung | |
| 6,690,387 B2 | 2/2004 | Zimmerman et al. | |
| 6,832,355 B1 | 12/2004 | Duperrouzel et al. | |
| 6,912,462 B2 | 6/2005 | Ogaki | |
| 7,009,599 B2 | 3/2006 | Pihlaja | |
| 7,075,512 B1 | 7/2006 | Fabre et al. | |
| 7,080,326 B2 | 7/2006 | Molander et al. | |
| 7,102,626 B2 | 9/2006 | Denny, III | |
| 7,178,109 B2 | 2/2007 | Hewson et al. | |
| 7,417,644 B2 | 8/2008 | Cooper et al. | |
| 7,469,381 B2 * | 12/2008 | Ording | 715/702 |
| 7,546,547 B2 | 6/2009 | Carey et al. | |
| 7,904,832 B2 | 3/2011 | Ubillos | |
| 2002/0191028 A1 | 12/2002 | Senechalle et al. | |
| 2005/0193340 A1 | 9/2005 | Amburgey et al. | |
| 2005/0193361 A1 | 9/2005 | Vitanov et al. | |
| 2005/0235206 A1 | 10/2005 | Arend et al. | |

(Continued)

FOREIGN PATENT DOCUMENTS

CA           2498541 A1    8/2005

OTHER PUBLICATIONS

"A Truly Touching Experience", retrieved on Dec. 29, 2008 at <<http://www.lge.com/products/model/detail/kf700.jhtml>>, LG Global Site.

(Continued)

*Primary Examiner* — William Bashore
*Assistant Examiner* — Hien Duong
(74) *Attorney, Agent, or Firm* — Lee & Hayes, PLLC

(57) ABSTRACT

A user interface and techniques for manipulating a graphical representation via indirect manipulation of focal controls are described. Generally, the user interface includes a graphical representation (e.g., an image, video, application, browser, map, etc.), one or more visible or transparent focal controls, and gesture detection functionality to detect inputs from a user. The user may provide this input via a peripheral device (e.g., a mouse, keyboard, etc.), a touch-screen display, or in another suitable manner. In each instance, the user provides an input relative to the focal control and, in response to detecting the input, the gesture detection functionality manipulates the underlying graphical representation.

18 Claims, 17 Drawing Sheets

(56) References Cited

U.S. PATENT DOCUMENTS

| | | | |
|---|---|---|---|
| 2006/0026521 A1* | 2/2006 | Hotelling et al. | 715/702 |
| 2006/0026535 A1* | 2/2006 | Hotelling et al. | 715/863 |
| 2006/0132460 A1* | 6/2006 | Kolmykov-Zotov et al. | 345/173 |
| 2006/0190833 A1* | 8/2006 | SanGiovanni et al. | 715/767 |
| 2006/0247855 A1* | 11/2006 | de Silva et al. | 701/212 |
| 2007/0024646 A1 | 2/2007 | Saarinen et al. | |
| 2007/0094698 A1 | 4/2007 | Bountour et al. | |
| 2008/0016458 A1 | 1/2008 | Good et al. | |
| 2008/0066016 A1* | 3/2008 | Dowdy et al. | 715/854 |
| 2008/0168401 A1 | 7/2008 | Boule et al. | |
| 2008/0297484 A1* | 12/2008 | Park et al. | 345/173 |
| 2008/0320419 A1* | 12/2008 | Matas et al. | 715/863 |
| 2009/0058828 A1* | 3/2009 | Jiang et al. | 345/173 |
| 2009/0119615 A1* | 5/2009 | Huang | 715/786 |
| 2009/0122018 A1* | 5/2009 | Vymenets et al. | 345/173 |
| 2009/0140995 A1* | 6/2009 | Kang | 345/173 |
| 2010/0156813 A1* | 6/2010 | Duarte et al. | 345/173 |

OTHER PUBLICATIONS

Brandl, et al., "An Adaptable Rear-Projection Screen Using Digital Pens and Hand Gestures", retrieved on Dec. 29, 2008 at <<http://staff.fh-hagenberg.at//haller/publications/2007/An%20Adaptable%20Rear-Projection%20Screen%20Using%20Digital%20Pens%20And%20Hand%20Gestures.pdf>>, pp. 1-6.

Dachselt, et al., "FacetZoom: A Continuous Multi-Scale Widget for Navigating Hierarchical Metadata", retrieved on Dec. 29, 2008 at <<http://delivery.acm.org/10.1145/1360000/1357265/p1353-dachselt.pdf?key1=1357265&key2=8360260321&coll=GUIDE&dl=GUIDE&CFID=16613364&CFTOKEN=38072166>>, CHI 2008 Proceedings, Apr. 5-10, 2008, Florence, Italy, pp. 1353-1356.

Kandogan, et al., "Elastic Windows: Evaluation of Multi-Window Operations", retrieved on Dec. 29, 2008 at <<http://delivery.acm.org/10.1145/260000/258720/p250-kandogan.pdf?key1=258720&key2=0270260321&coll=GUIDE&dl=GUIDE&CFID=16088628&CFTOKEN=41005193>>, CHI 97, Mar. 22-27, 1997, Atlanta GA, USA, 8 pages.

Karson, et al., "AppLens and LaunchTile: Two Designs for One-Handed Thumb Use on Small Devices", retrieved on Dec. 29, 2008 at <<http://delivery.acm.org/10.1145/1060000/1055001/p201-karlson.pdf?key1=1055001&key2=9870260321&coll=GUIDE&dl=GUIDE&CFID=16613560&CFTOKEN=64905172>>, CHI 2005, Papers: Small Devices 1, Apr. 2-7, Portland, Oregon, USA, pp. 201-210.

Moscovich, et al., "Navigating Documents with the Virtual Scroll Ring", retrieved on Dec. 29, 2008 at <<http://delivery.acm.org/10.1145/1030000/1029642/p57-moscovich.pdf?key1=1029642&key2=0780260321&coll=GUIDE&dl=GUIDE&CFID=16088809&CFTOKEN=41557310>>, UIST 2004, Oct. 24-27, 2004, Santa Fe, New Mexico, USA, pp. 57-60.

RedZee Search, retrieved on Feb. 24, 2008 at <<http://redzee.com/>>, RedZee Search Inc., 5 pgs.

Schraefel, et al., "Curve Dial: Eyes-Free Parameter Entry for GUIs", retrieved on Dec. 29, 2008 at <<http://eprints.ecs.soton.ac.uk/10053/1/I-07-schraefel.pdf>>, CHI 2005, Apr. 2-7, 2004, Portland, Oregon, USA, 2 pages.

Smith, et al., "Generalized and Stationary Scrolling", retrieved on Dec. 29, 2008 at <<http://delivery.acm.org/10.1145/330000/322577/p1-smith.pdf?key1=322577&key2=0490260321&coll=GUIDE&dl=GUIDE&CFID=16613757&CFTOKEN=41889447>>, UIST 1999, Asheville, NC., CHI Letter vol. 1, 1, pp. 1-9.

Wang, et al., "Designing a Generalized 3D Carousel View", retrieved on Dec. 29, 2008 at <<http://delivery.acm.org/10.1145/1060000/1057081/p2017-wang.pdf?key1=1057081&key2=6990260321&coll=GUIDE&dl=GUIDE&CFID=16613868&CFTOKEN=53845534>>, CHI 2005, Late Breaking Results: Short Papers, Apr. 2-7, Portland, Oregon, USA, pp. 2017-2020.

Office Action for U.S. Appl. No. 12/324,975, mailed on Apr. 29, 2011, Min Wang, "Multi-Panel User Interface".

"Programs by Brian Apps", Retrieved on Apr. 21, 2011 at <<http://replay.web.archive.org/20071110191004/http://www.brianapps.net/>> and <<http://replay.web.archive.org/20071106025416/http://www.brianapps.net/sizer.html>>, Published on Nov. 6, 2007, 6 pgs.

Kandogan et al., "Elastic Windows: Evaluation of Multi-Window Operations," retrieved on Sep. 30, 2008 at <<http://www.sigchi.org/chi97/proceedings/paper/ek.htm>>, ACM (CHI 97), Mar. 26, 1997, pp. 1-15.

Final Office Action for U.S. Appl. No. 12/324,975, mailed on Oct. 19, 2011, Min Wang, "Multi-Panel User Interface," 26 pages.

Wei et al., "Integrating Lite-Weight but Ubiquitous Data Mining into GUI Operating Systems," retrieved on Sep. 30, 2008 at <<http://www.jukm.org/jucs_11_11/integrating_lite_weight_but/jucs_11_11_1820_1834_wei.pdf>>, Journal of Universal Computer Science, vol. 11, No. 11, Nov. 28, 2005, pp. 1820-1834.

\* cited by examiner

FOCAL-CONTROL USER INTERFACE

BACKGROUND

Computer system user interfaces often utilize a virtual pointer to manipulate a graphical representation on a display screen. The virtual pointer can either be visible (as in the case when a peripheral device such as a mouse is used) or implied (as in the case when a touch-sensitive display screen is used). Each of these types of virtual pointers can support two distinct styles of user input: direct manipulation and gesturing.

In the case of direct manipulation, a user can either directly manipulate the graphical representation (e.g., by panning a map via dragging of the map) or directly manipulate a peripheral control to manipulate the graphical representation (e.g., by dragging a slider to adjust the zoom level at which a map is displayed).

In the case of gesturing, however, the motion of the pointer need not bear any relation to the underlying representation. That is, these gestures can be interpreted arbitrarily (e.g., drawing spirals anywhere may cause scrolling within a linear document).

However, each of these approaches has shortcomings. Direct manipulation requires that the pointer be used as a tool, which leads to the potentially problematic need to switch between tools. For instance, the screen must accommodate the icons or menu items representing the possible tool choices, thus consuming the valuable resource of display space. Furthermore, in the case of direct manipulation of the graphical representation, the user may accidentally select incorrect tools or may misremember the current tool selection. In both cases, since the selected tool rather than the nature of the action determines the effect of the action, actions with the tool lead to unexpected effects.

Although direct manipulation of controls does not suffer from this latter shortcoming (since the effects of actions such as clicking and dragging are interpreted differently in different areas of the screen according to the function of the underlying control), this type of direct manipulation also presents unique challenges. First, these controls again consume display space and require the user to divide the user's attention between the manipulation of the peripheral control and its effect on the graphical representation.

Finally, although the third interaction alternative of gesturing allows actions to be performed directly on top of the graphical representation, the graphical representation itself does not provide clues as to what gestures the underlying computer system will interpret nor how the system will interpret such gestures.

SUMMARY

A user interface and techniques for manipulating a graphical representation via indirect manipulation of focal controls are described herein. The user interface comprises a graphical representation (e.g., an image, a browser, an application, a map, content, etc.), one or more focal controls embedded within the graphical representation, and gesture detection functionality to detect input of a user. In certain described implementations, the focal control comprises a focal ring that is displayed over, within or underneath the graphical representation.

To manipulate the graphical representation, the user indirectly manipulates the focal ring by providing input that is interpreted relative to the focal ring. For instance, the user may provide input that is towards or away from the focal ring, into or out of the focal ring, or through or around the focal ring. The gesture detection functionality detects each of these inputs and, in response, manipulates the underlying graphical representation in corresponding manners (e.g., panning, zooming, scrolling, etc.). Thus, in the described implementation, the focal ring provides a visual cue to the user without sacrificing valuable display space and without dividing the attention of the user between the graphical representation and the focal control.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

Here, the user navigates downwards and upwards a hierarchical tree via inputs that are into and out of the focal ring, respectively.

Figure 10:
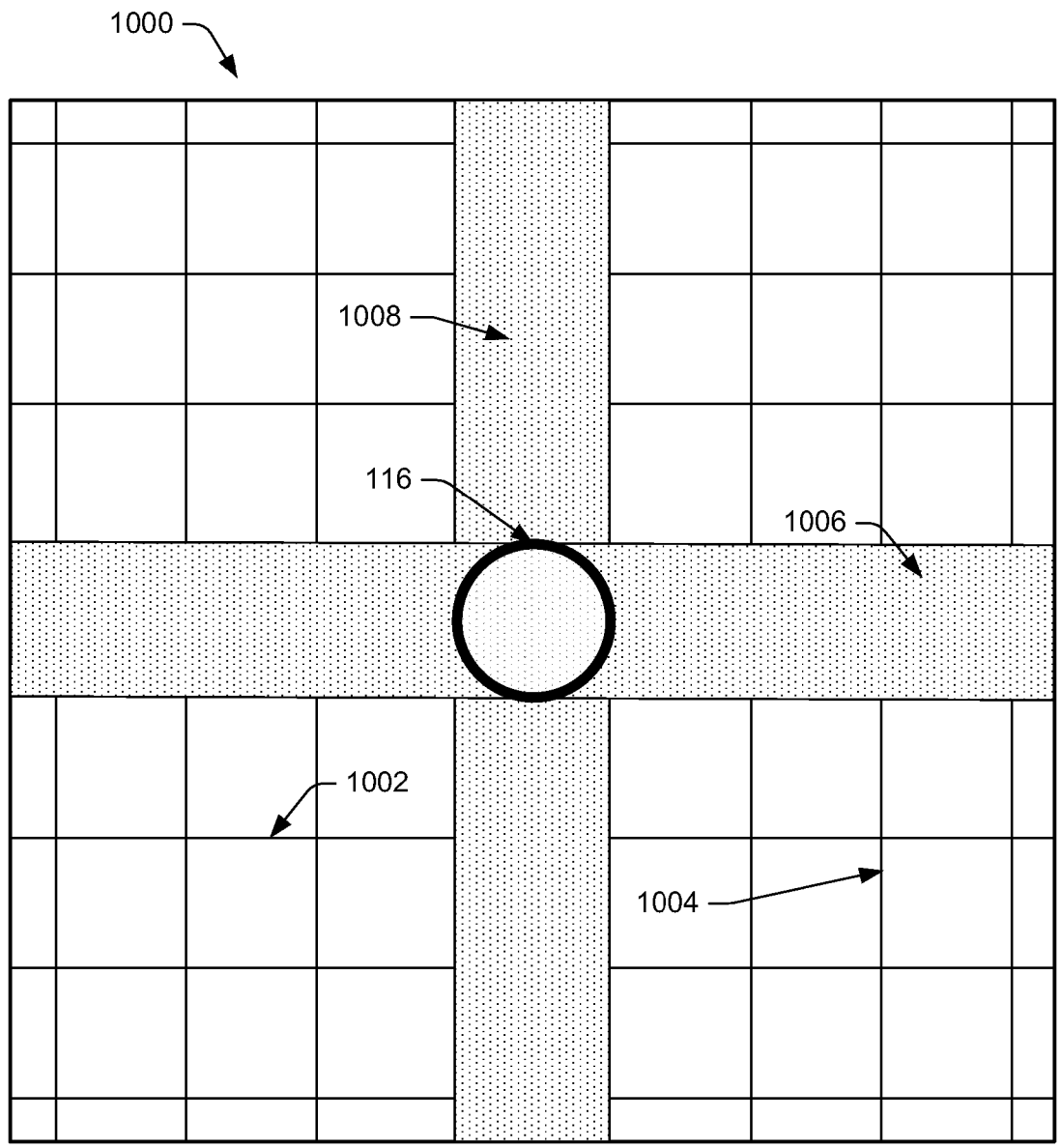
Figure 11A:
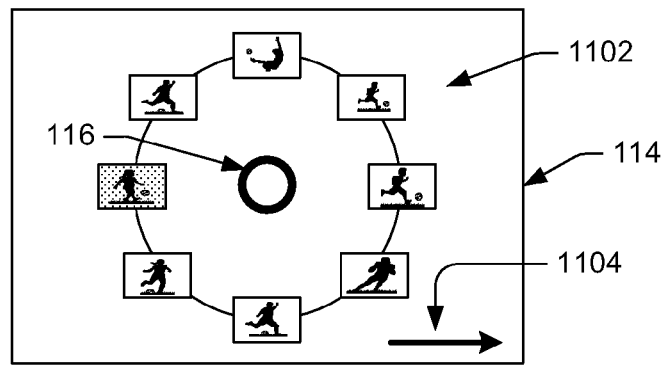
Figure 11B:
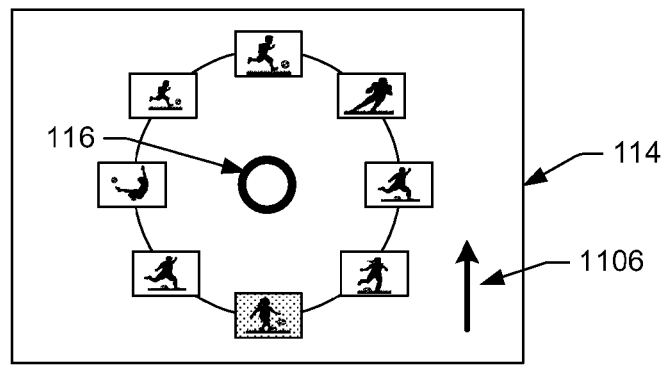
Figure 11C:
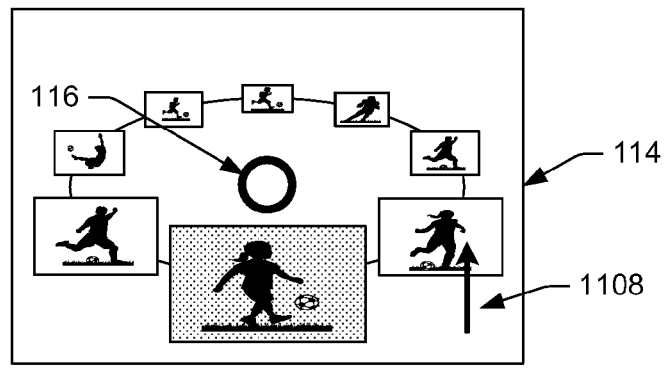
Figure 11D:
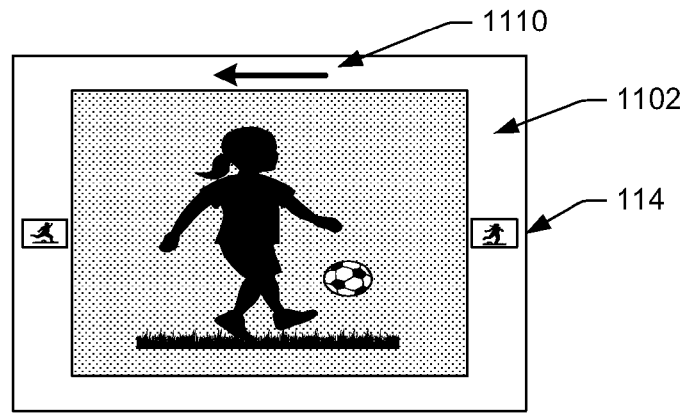
Figure 11E:
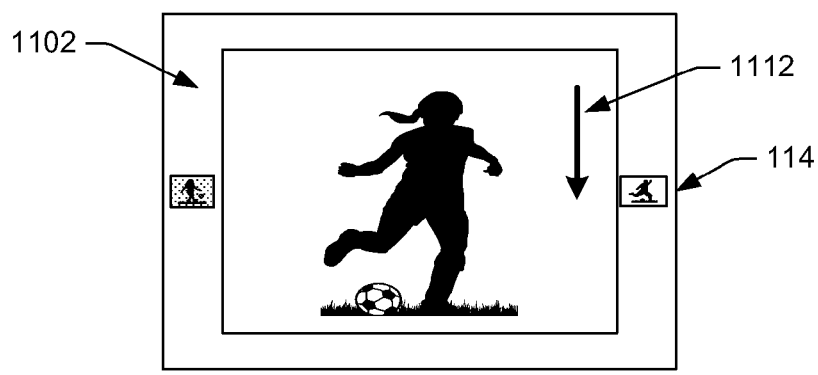
Figure 11F:
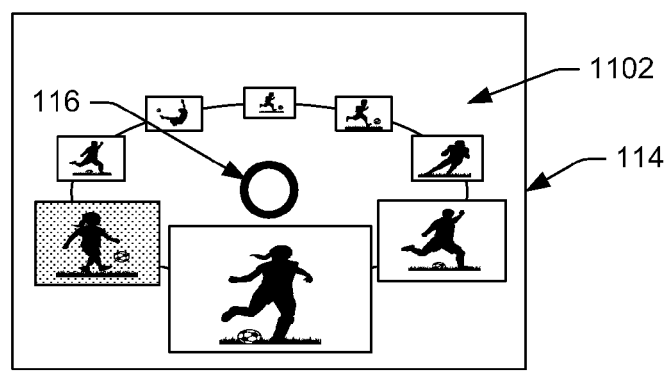

FIG. 10 illustrates a third frame of reference that the focal-control UI may implement for facilitating indirect manipulation of the focal ring. Here, a user may provide input that is in one or more predefined directions (e.g., horizontal, vertical, diagonal, etc.) relative to the focal ring.

FIGS. 11(a)-(f) illustrate an example manipulation of a graphical representation in response to a user providing inputs in accordance with the frame of reference from FIG. 10. Here, the user rotates a content carousel via a horizontal input and tilts the carousel via a vertical input.

Figure 12:
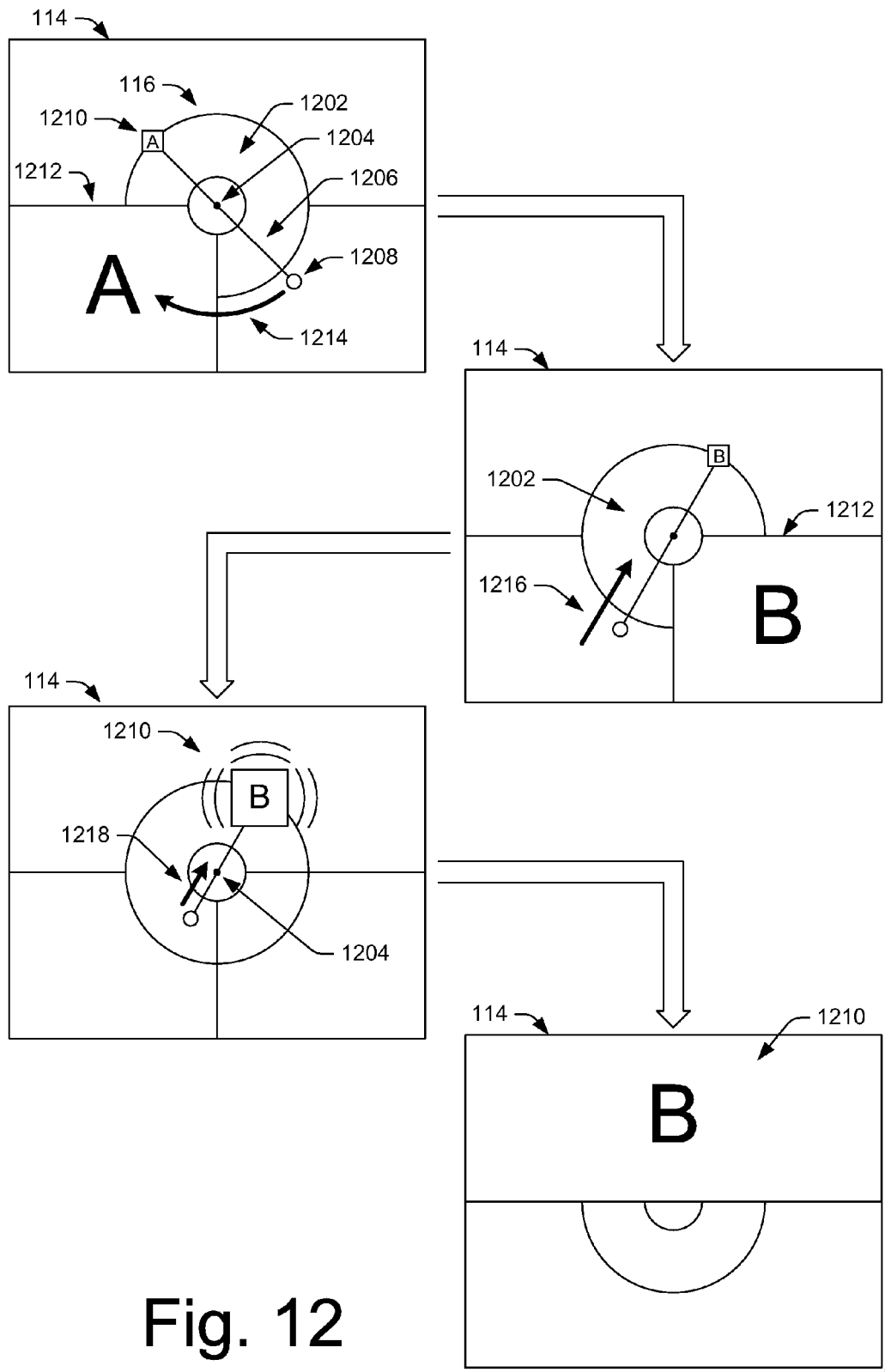

FIG. 12 shows an example pendulum navigation sequence where a user is able to select a piece of content by moving a pendulum on a UI via inputs interpreted relative to the focal ring. Once a piece of content is selected, the user is also able to expand the selected piece of content.

Figure 13:
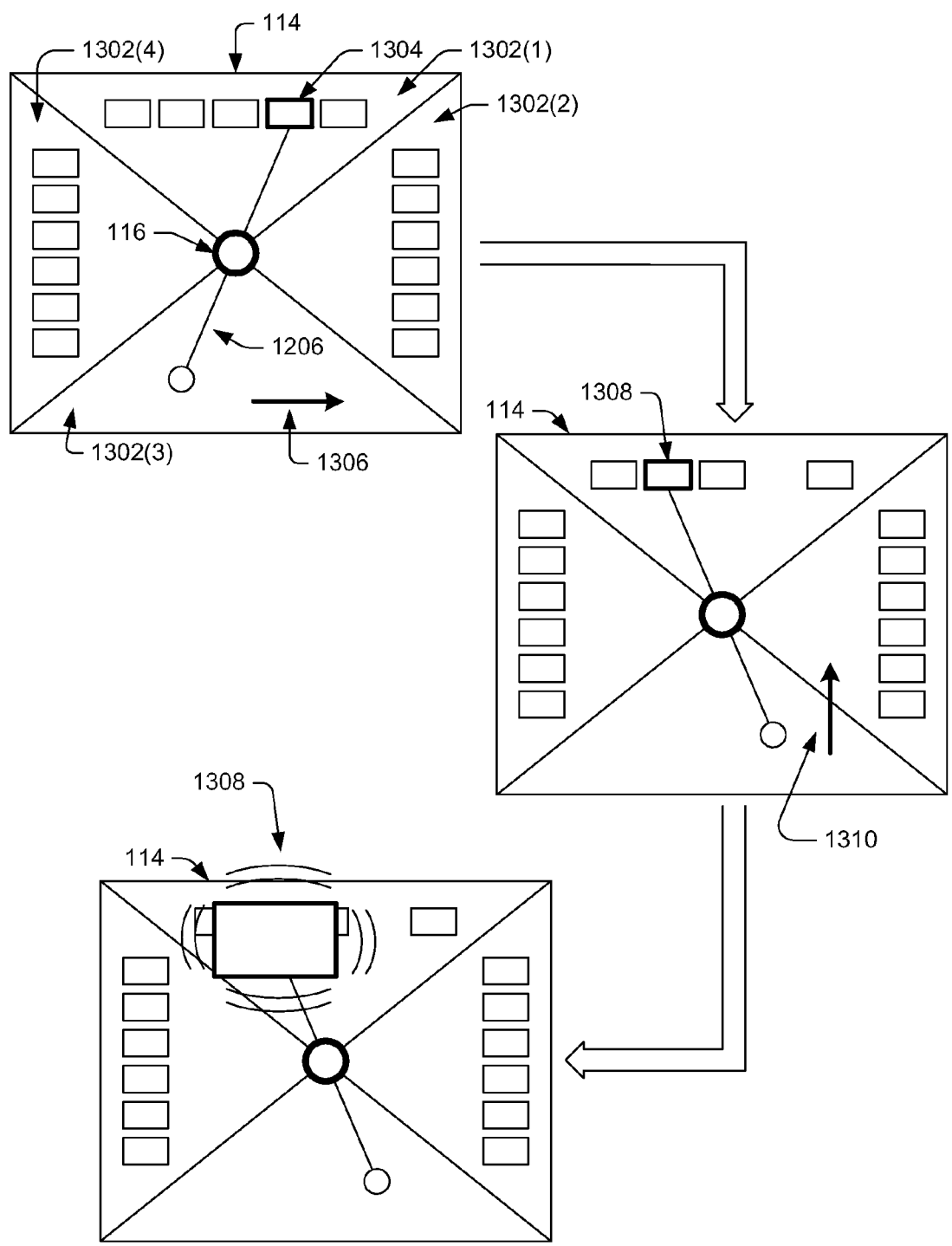

FIG. 13 shows another example pendulum navigation sequence where a user is able to select a piece of content by moving a pendulum on a UI via inputs interpreted relative to the focal ring. Again, once a piece of content is selected, the user is also able to expand the selected piece of content.

Figure 14:
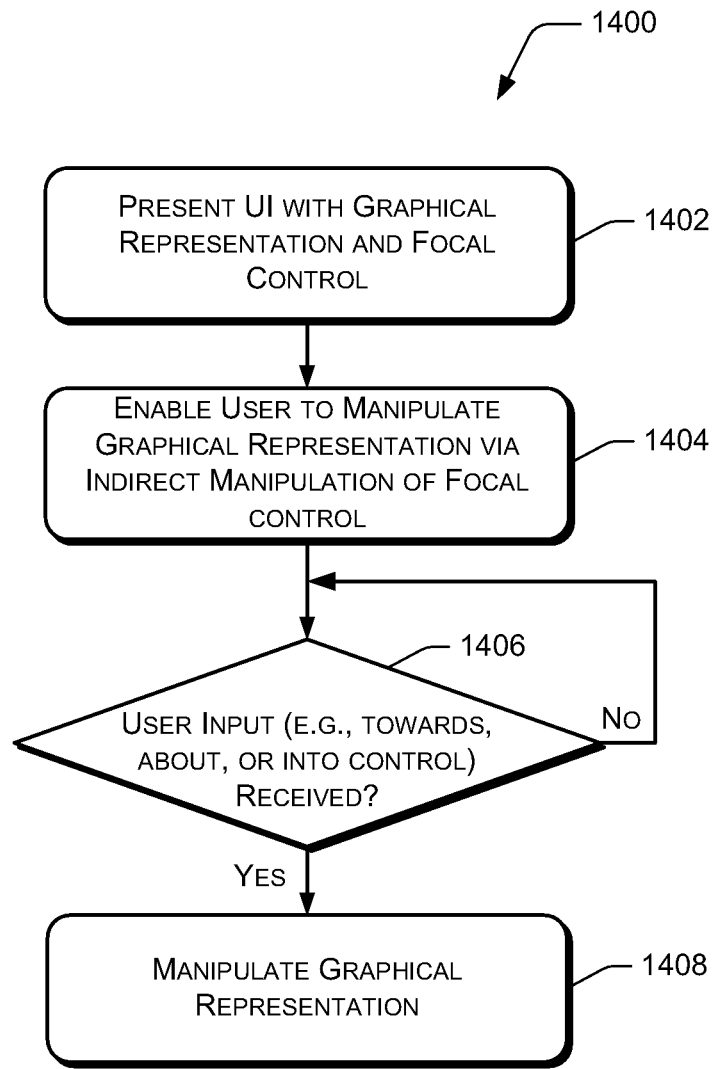

FIG. 14 is a flow diagram illustrating a process for facilitating manipulation of a graphical representation via indirect manipulation of a focal control.

DETAILED DESCRIPTION

This disclosure describes a user interface and techniques for manipulating a graphical representation via indirect manipulation of focal controls. Generally, the user interface includes a graphical representation (e.g., an image, video, application, browser, map, etc.), one or more visible or transparent focal controls, and gesture detection functionality to detect inputs from a user. The user may provide this input via a peripheral device (e.g., a mouse, keyboard, etc.), a touch-screen display, or in another suitable manner. In each instance, the user provides an input relative to the focal control and, in response to detecting the input, the gesture detection functionality manipulates the underlying graphical representation.

For instance, a user may provide an input that is towards, away from, into, out of, or in a predefined direction relative to the focal control. In response, the gesture detection functionality may manipulate the graphical representation in a corresponding manner, such as by panning, zooming in or out on, navigating, or otherwise operating upon the graphical representation.

In one described implementation, the focal control comprises a focal ring of a constant size that is displayed over a central location of the graphical representation. The user then provides inputs relative to the focal ring, with the inputs being interpreted with reference to one or more predefined frames of reference. By visually displaying this focal ring in a central location of the graphical representation, the described techniques provide a visual cue to the user informing the user how to navigate or otherwise manipulate the displayed graphical representation. The techniques also avoid dividing the user's attention between a peripheral control (e.g., located in a corner of the screen) and the underlying graphical representation. Furthermore, and as will be appreciated below, the described techniques allow the user to chain together multiple commands without breaking contact with a display on which the user provide the inputs.

While aspects of described techniques can be implemented in any number of different computing systems, environments, and/or configurations, embodiments are described in the context of the following exemplary computing environments.

Example Computing Environments

Figure 1:
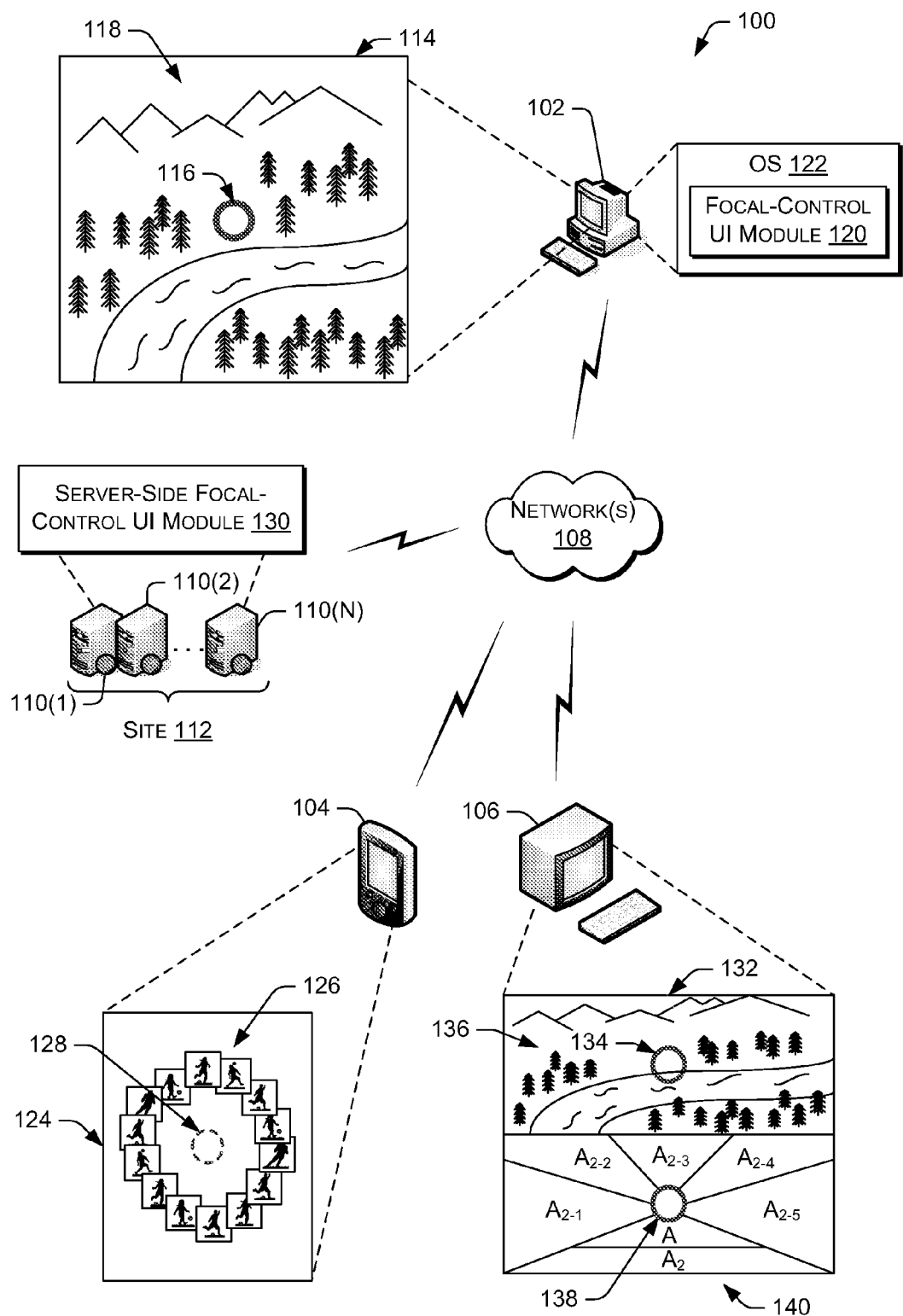
FIG. 1 illustrates an exemplary computing environment with multiple computing devices each configured to render a user interface (UI) with a graphical representation and a focal control that, when indirectly manipulated by a user, manipulates the graphical representation. Here, the focal control takes the form of a focal ring.

FIG. 1 illustrates various computer environments 100 that may each implement a focal-control user interface (UI). Environments 100 include exemplary computing devices that are configured to present content within the UI. In this illustrated example, the computing devices include a personal computer 102 (e.g., a desktop, laptop, etc.), a portable handheld computing device 104 (e.g., a PDA, smart phone, etc.), and a thin client or other terminal 106. All three computing devices 102-106 are capable of connecting to one or more networks, as represented by network 108, although certain computing devices (e.g., personal computer 102) may be operated as a standalone device without connection to a network.

The network 108 is representative of any one or combination of multiple different types of networks, interconnected with each other and functioning as a single large network (e.g., the Internet or an intranet). The network 108 may include wire-based networks (e.g., cable) and wireless networks (e.g., cellular, satellite, etc.). The network 108 may use any number of protocols and configurations to enable the computing devices 102-106 to access other devices and resources.

A representative set of servers 110(1), 110(2), ..., 110(N) is accessible via the network 108. The servers 110(1)-110(N) may be independent servers, or a collection of servers that are configured to perform larger scale functions (e.g., a server farm), or a set of servers configured to host one or more sites (e.g., websites) accessible by the network 108. In the illustrated example, the servers 110(1)-110(N) may represent private servers that serve content and programming to the thin client 106. Alternatively, the servers 110(1)-110(N) may represent a wireless services provider that provides content to wireless devices, such as portable handheld computing device 104. In still other implementations, the servers 110(1)-110(N) may be configured to host a site 112, such as a website accessible by any one of the computing devices 102-106 via the Internet.

These various arrangements exhibit examples of environments that may employ a focal-control UI. Each computing device may present a focal-control UI on a display screen. In a first example operating environment, the personal computer 102 presents a focal-control UI 114 on a display, such as a CRT, flat LCD screen, or other display types. The focal-control UI 114 includes a focal control (here, a focal ring 116) and a graphical representation 118 (e.g., an image, video, application, browser, map, etc.). The focal-control UI 114 also includes gesture detection functionality (illustrated in FIG. 2) to detect user input relative to the focal ring 116 and, in response, manipulate the graphical representation 118.

In the illustrated implementation, the focal control takes the form of the focal ring 116 situated in a center of the graphical representation 118. In other instances, the focal control may take the form of an oval ring, a polygonal ring (e.g., a triangle, square, etc.) or any other shape. Furthermore, the focal ring 116 or other focal control may reside in a location other than the center of the graphical representation 118 and may or may not be visible to a user.

To illustrate the capability of the focal-control UI 114, a user of the personal computer 102 may use a peripheral device (e.g., a mouse, keyboard, etc.) to provide inputs relative to the focal ring 116. These inputs that are relative to the ring reflect an indirect manipulation of the ring which, in the illustrated example, remains fixed in the central location and of a constant size and shape. In response to the inputs, the gesture detection functionality manipulates the graphical representation 118 by, for example, panning the image, zooming in on the image, rotating the image or the like.

The focal-control UI 114 is implemented as a module 120 as part of an operating system 122 that is stored and executed by the personal computer 102. A more detailed discussion of this example context is described below with reference to FIG. 2.

In a second example operating environment, the portable computing device 104 presents another focal-control UI 124 on its touch-sensitive screen (or "touch screen"). The focal-control UI 124 has a graphical representation 126 as well as a focal ring 128 that is transparent on the display (that is, invisible to the user, as represented by dashed lines). Here, the user again provides inputs relative to the transparent focal ring 128 and, in response to detecting these inputs, the underlying gesture detection functionality manipulates the graphical representation 126 in a corresponding manner. In this example, the focal control UI 124 may be implemented as a software module executing on the device 104, or alternatively, as functionality served as part of the content delivered by the servers 110(1)-110(N). Thus, as illustrated, a server-side focal-control UI module 130 is executing at the servers 110(1)-110(N) to serve content to the portable computing device 104 with the UI functionality described herein.

In a third example operating environment, the thin client 106 presents another version of a focal-control UI 132 that is depicted on a display, such as a CRT. Like the UI 114 of the personal computer 102, this focal-control UI includes a focal ring 134 and a graphical representation 136. Here, however, the UI 132 includes a second focal ring 138 and a second graphical representation 140. The thin client 106 thus represents that, in certain implementations, the focal-control UI module may serve any number of focal and any number of graphical representations. Furthermore, each of these focal rings may comprise different functionality that responds to user inputs in different manners. As such, the UI module may also serve any number of varying or similar gesture detection functionalities. Note that while the UI 132 is supported by the server-side multi-panel UI module 130 in this thin client context, the dual focal-control configuration may apply in any other context. Furthermore, each feature described above with reference to a particular device or context may also apply to any other device or context.

Focal-Control UI Examples

Figure 2:
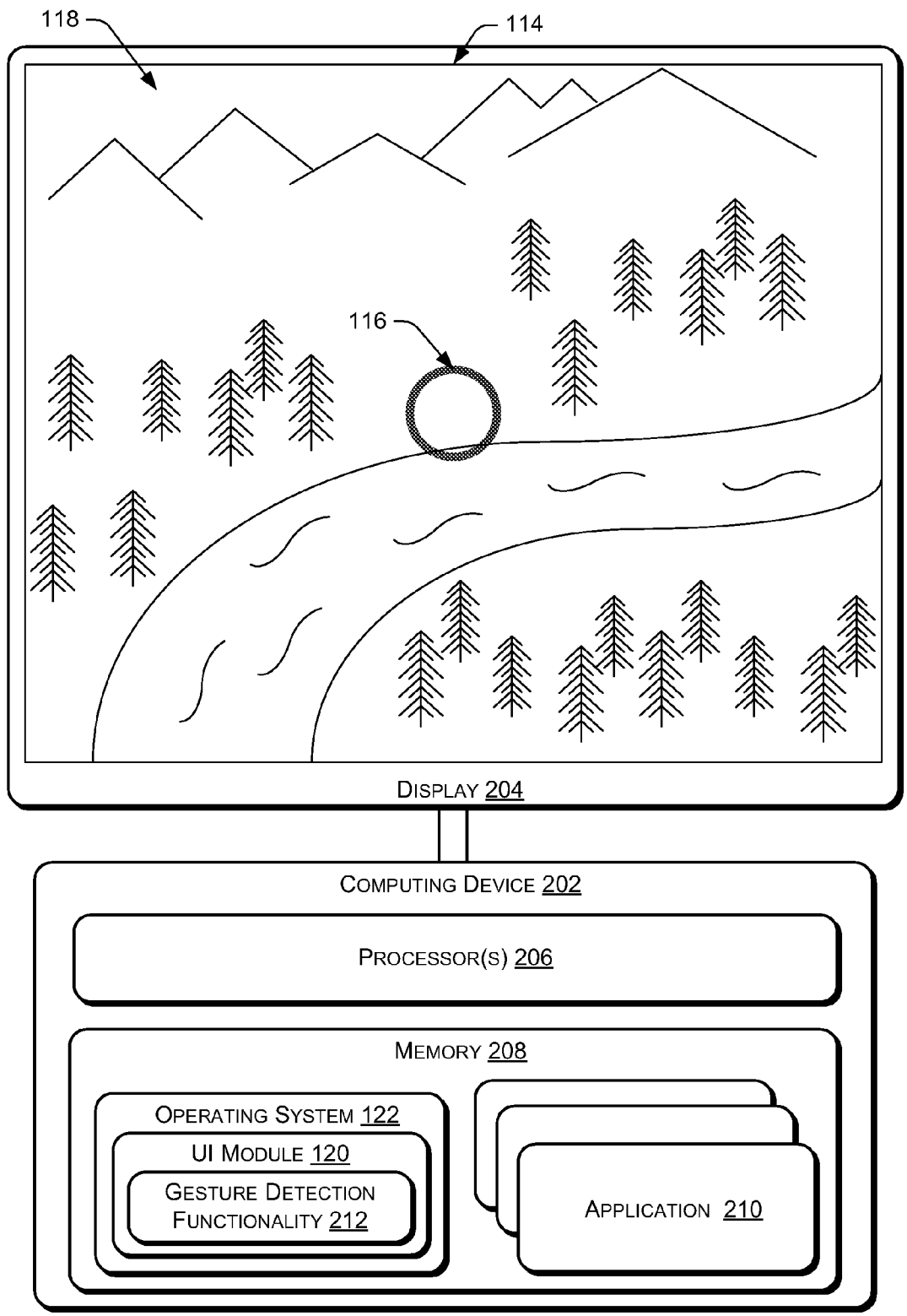
FIG. 2 is a block diagram of one of the computing devices in FIG. 1, and illustrates a focal-control UI in more detail.

FIG. 2 shows a more detailed system 200 in which the focal-control UI is implemented. The system 200 is embodied as a computing device 202 that presents the focal-control UI 114 on a display 204. The computing device 202 may be representative of any number of devices, including, for example, a personal computer, portable computer, communication device, entertainment device, and so forth. The computing device 202 has a processor 206 and a memory 208. The memory 208 includes computer-readable media in the form of volatile memory, such as Random Access Memory (RAM) and/or non-volatile memory, such as Read Only Memory (ROM) or flash RAM. In FIG. 2, the memory 208 stores an operating system 122 and one or more application programs 210 that are accessible by and executable on the processor 206. The memory 208 may further store various forms of content.

The focal-control UI module 120 is shown as part of the OS 122 in the FIG. 2 implementation. When executed by the processor 206, the UI module 120 presents the focal-control UI 114 on the display 204. In this example, the UI 114 covers all available screen area of the display 204, although in other embodiments, it may be configured to cover less than the entire screen area. The focal-control UI 114 has a focal ring 116 and a graphical representation 118. Here the graphical representation comprises a map or other image that a user may navigate with use of input relative to the focal ring 116. The focal-control UI module 120 and, hence, the focal-control UI 114 also includes gesture detection functionality 212 to detect the user input and manipulate the graphical representation 118.

A size of a focal control such as focal ring 116 may vary depending on implementation and design consideration. For instance, a small ring may require very accurate user inputs relative the focal ring, but this smaller ring may enable quick transition to other operations. A larger ring, meanwhile, may provide more space that may in turn require less accurate user inputs, but this larger ring may make for a slightly more difficult transition to other operations.

Figure 3:
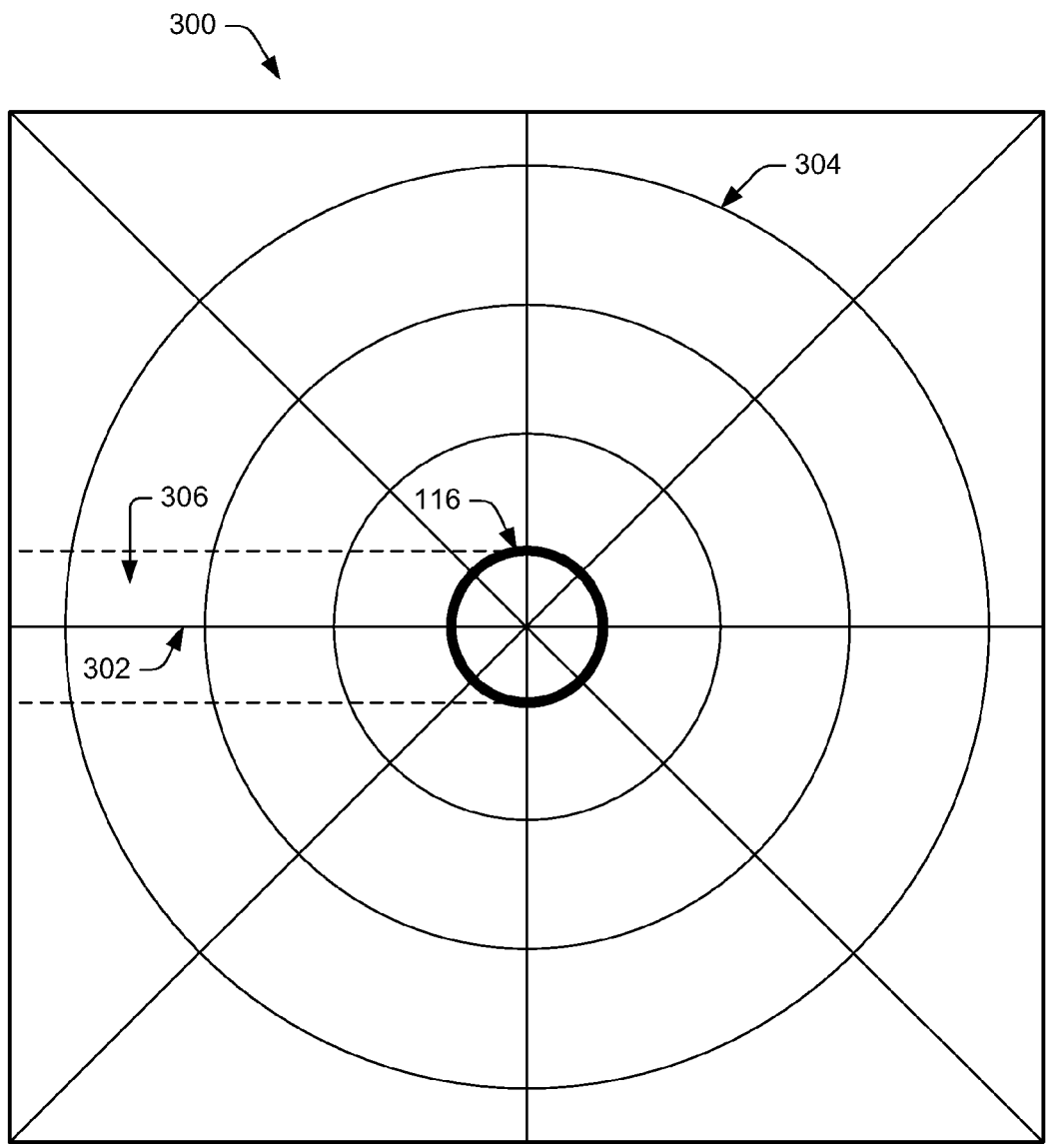
FIG. 3 illustrates a first frame of reference that the focal-control UI may implement for facilitating indirect manipulation of the focal ring. Here, a user may provide input that is towards or away from the focal ring, as well as input that is about the focal ring.

FIG. 3 illustrates a first frame of reference 300 that the focal-control UI 114 may implement for facilitating indirect manipulation of the focal ring 116. With this frame of reference 300, a user may provide input that is towards or away from the focal ring and input that is about the focal ring. In response, the gesture detection functionality 212 detects this input and correspondingly manipulates a graphical representation.

As illustrated, the frame of reference 300 depicts a polar coordinate grid consisting of lines that 302 that run through the center of the focal ring 116 and concentric circles 304 that encircle the focal ring 116. When the focal-control UI 114 implements this frame of reference 300, the gesture detection functionality 212 detects user input that is along lines 302 as well as a user input that is about the focal ring 116 via concentric circles 304. Furthermore, the user may be able to freely pan within the small inner circular area of the focal ring 116.

In order to provide a margin of error for the user input, the gesture detection functionality 212 may detect input within a certain distance from a particular line 302. For instance, the frame of reference may allow the input of the user to stray a distance corresponding to the diameter of the focal ring 116. That is, if a user provides an input along line 302 (towards or away from the focal ring 116) within a region 306 (the area within the illustrated dotted lines), then the gesture detection functionality 212 may detect this input and manipulate the underlying graphical representation accordingly. The frame of reference 300 may provide a similar margin for error for user inputs along concentric circles 304.

In both cases, it is the initial accurate point of contact that is subsequently acted upon within the bounds of error. In some instances, the UI may provide visual assistance to the user illustrating the amount error that gesture detection functionality 212 will accept. These "mode guides" may comprise either a concentric circle or a crossing line at the point of current contact (e.g., current touch contact), depending on the effect of the current gesture. On initial contact, both are shown as possible continuations to help train the user. The crossing lines help the user to stroke through the center of the ring, while the concentric circles help the user to circle around the ring, rather than accidentally cutting through it. A consistent concentric-circle mode guide means that the user is circling accurately.

Figure 4A:
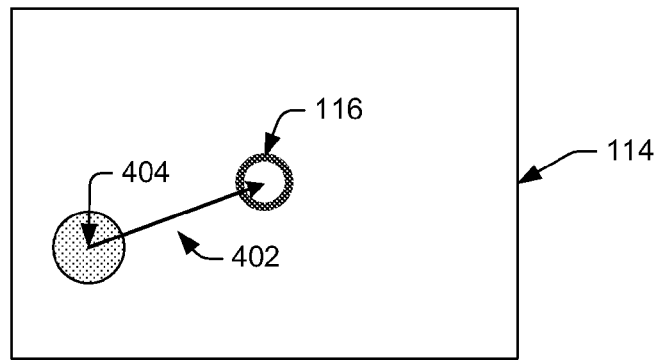
FIGS. 4(a)-4(c) illustrate an example manipulation of a graphical representation in response to a user providing inputs in accordance with the frame of reference from FIG. 3. Here, the user pans the graphical representation via input towards the focal ring and zooms in or out on the graphical representation via input about the focal ring.
Figure 4B:
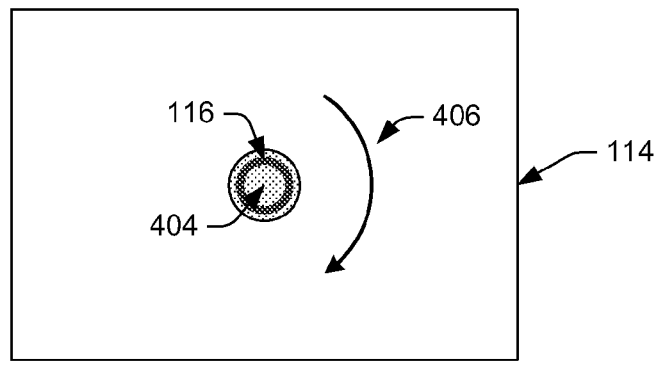
Figure 4C:
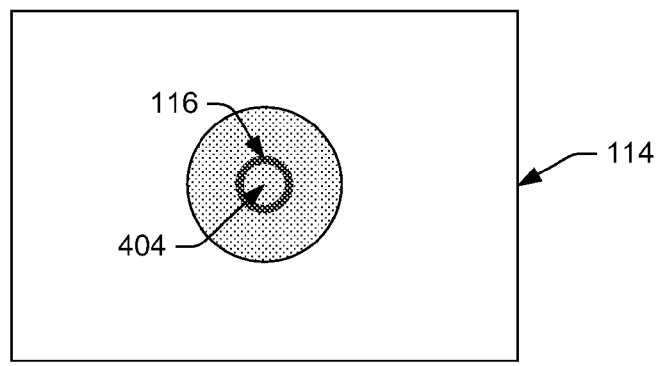

FIGS. 4(a)-4(c) illustrate an example manipulation of a graphical representation in response to a user providing inputs in accordance with the frame of reference 300 of FIG. 3. Here, the user first provides an input 402 (e.g., via a peripheral device or via a touch screen) at a point of contact 404 along a direction towards and ending within the focal ring 116. That is, the user makes contact with the representation (e.g., with a virtual pointer, a finger, a stylus, etc.) and maintains contact until the user reaches the center of the focal ring 116. FIG. 4(b) illustrates that, in response, the gesture detection functionality 212 pans the graphical representation and centers the point of contact 404 with the center of the focal ring 116. FIG. 4(b) also illustrates that the user provides an input 406 that is about the focal ring 116 after the panning of the representation. In response, the gesture detection functionality 212 zooms in on the illustrated implementation as shown in FIG. 4(c).

If the user were to provide an input in a direction about the focal ring 116 and opposite of the input 406, the functionality 212 may zoom out on the representation. Furthermore, while this discussion describes zooming in responsive to a clockwise input and zooming out responsive to a counterclockwise input, other implementations may operate in the opposite manner. Furthermore, as can be appreciated from FIGS. 4(a)-(c), the user may chain together multiple commands without breaking input with the display. For instance, the user can chain together multiple pan and zoom operations in a fluid manner without breaking contact with the display.

Figure 5:
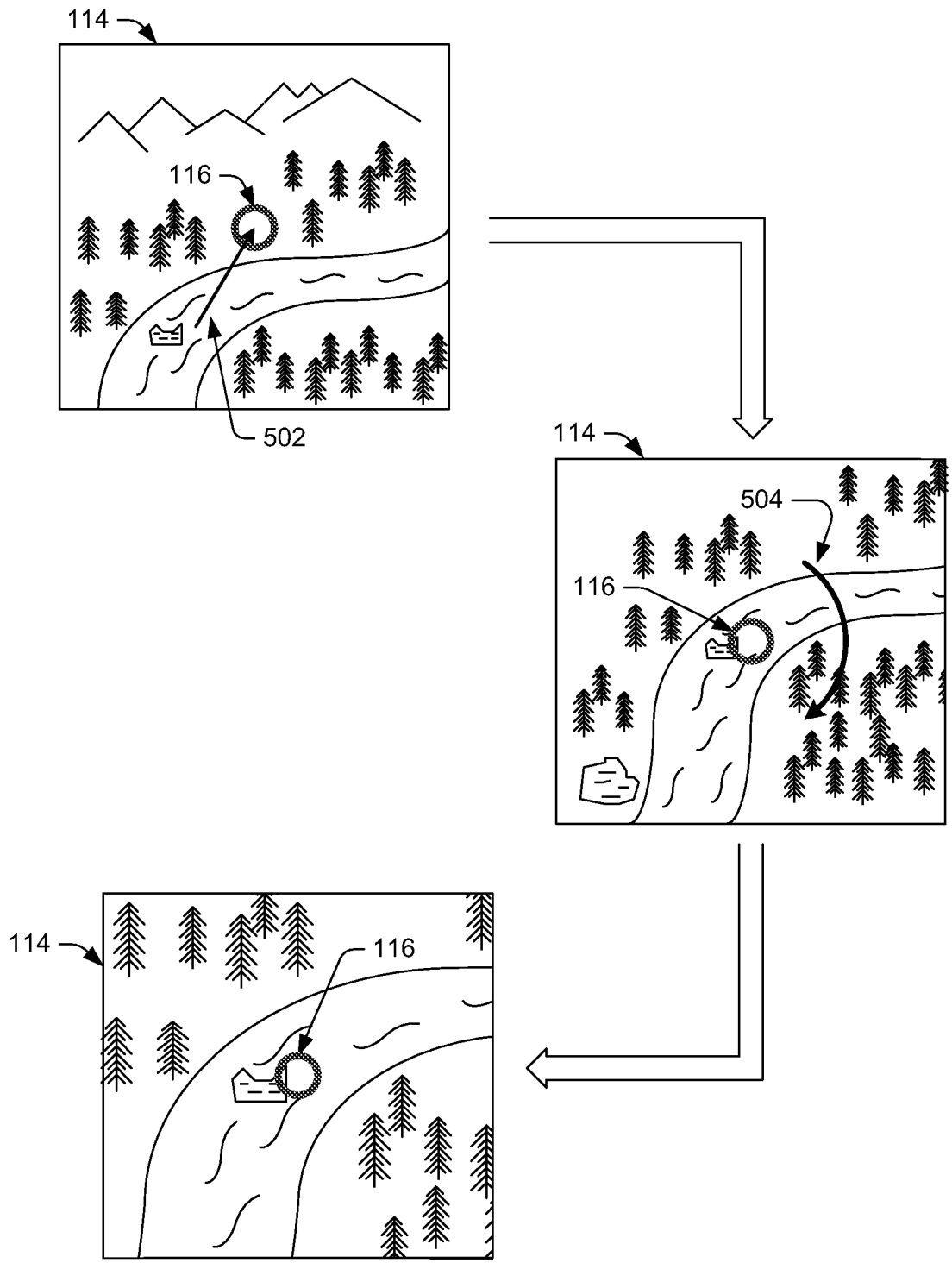
FIG. 5 shows an example pan and zoom navigation sequence performed on an image (e.g., a map, photograph, etc.).

FIG. 5 shows an example pan and zoom navigation sequence performed on an image, such as a map or a photograph. Here, a user provides an input 502 and, in response, the UI 114 pans to the point of contact from which the input originated. Next, the user provides an input 504 that is about the focal ring 116 (e.g., all the way around the focal ring, a portion of the way around the focal ring, etc.) and, in response, the UI 114 zooms in to the representation. More particularly, the UI 114 zooms into the portion of the graphical representation within the center of the focal ring 116.

As this example illustrates, user inputs that are directed towards, away from, or through the focal ring 116 are interpreted as a pan operations, while user inputs that rotate around the focal ring 116 in a radial or circular manner are interpreted as bidirectional zoom operations. For example, a user input that rotates clockwise around the focal ring 116 performs a zoom-in operation, while a user input that rotates counterclockwise around the focal ring performs a zoom-out operation. The focal-control UI 114 thus allows a user to easily pan and zoom a graphical representation, such as a map.

FIGS. 6(a)-6(e) illustrate another example manipulation of a graphical representation in response to a user providing inputs in accordance with the frame of reference from FIG. 3. Here, the user provides touch inputs via a touch screen. As described below, the user causes panning of the graphical representation via a single-point-of-contact input towards the focal ring and causes a zoom-in or zoom-out operation via a multiple-points-of-contact input towards or away from the focal ring.

Figure 6A:
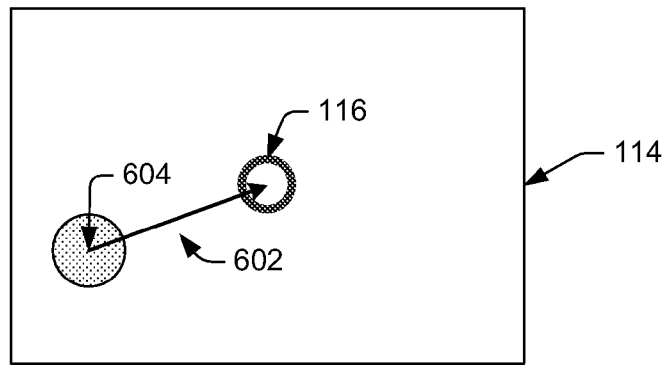
FIGS. 6(a)-6(e) illustrate another example manipulation of a graphical representation in response to a user providing inputs in accordance with the frame of reference from FIG. 3. Here, the user pans the graphical representation via a single-point-of-contact input towards the focal ring and zooms in or out on the graphical representation via a multiple-points-of-contact input towards or away from the focal ring.
Figure 6B:
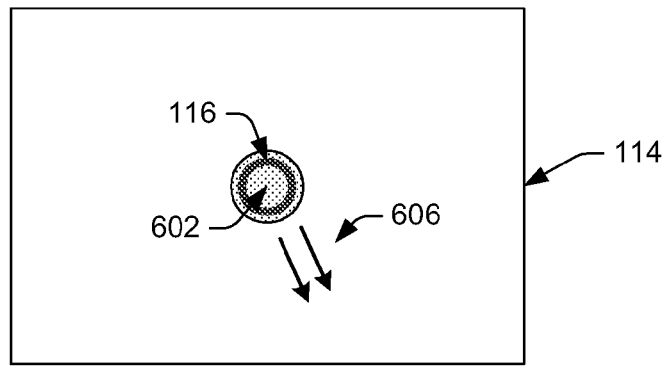

FIG. 6(a) first illustrates that a user provides a touch input 602 from a point of contact 604 towards and ending within the focal ring 116. This touch input consists of a single point of contact (e.g., one finger, one stylus, etc.) and may be accomplished by a user touching the graphical representation on the touch-sensitive screen and, while maintaining contact with the screen, moving the user's finger or style toward the center of the focal ring 116. In response, FIG. 6(b) illustrates that the UI 114 pans the underlying graphical representation such that the point of contact now resides under the focal ring 116. While this input may be along a line (as illustrated), the input can also be of any shape and direction. That is, as long as there is only one point of contact with the screen, the representation will shift and follow the movements of the user input 602 as a pan operation.

Figure 6C:
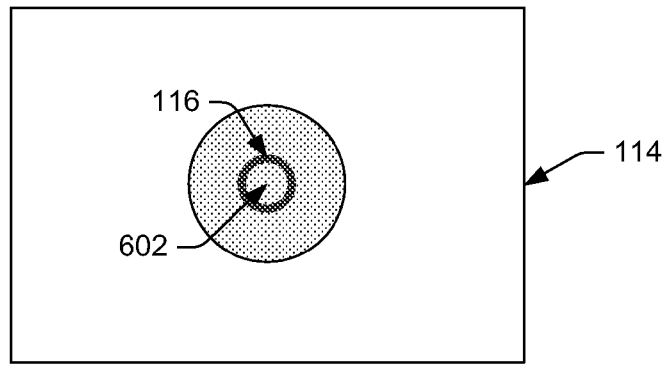

FIG. 6(b) also illustrates that the user provides an input 606 that comprises multiple points of contact (e.g., two fingers). Here, the input 606 comprises moving the multiple points of contact in parallel and in a direction away from the focal ring 116. This input may be thought of as stretching the graphical representation and, hence, FIG. 6(c) illustrates that the gesture detection functionality 212 performs a zoom-in operation in response to the input.

Figure 6D:
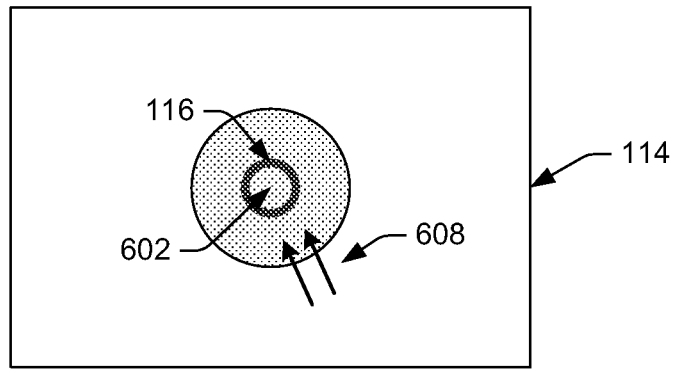
Figure 6E:
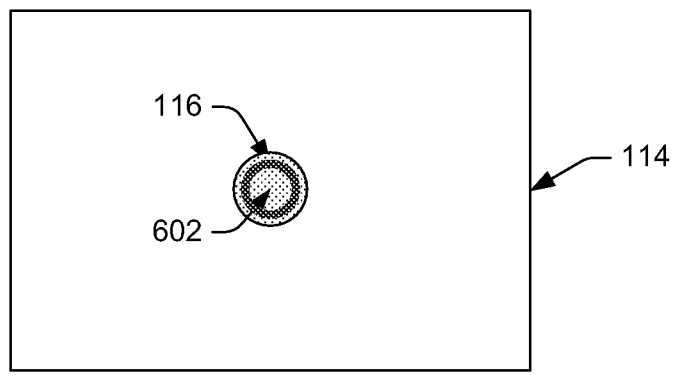

Next, FIG. 6(d) illustrates that the user provides an input 608 that also comprise multiple points of contact. This time, however, the input 608 is towards the center of the focal ring 116. Here, the UI performs a zoom-out operation on the graphical representation in response to the input 608 as shown in FIG. 6(e). Of course, other implementations may perform a zoom-in operation in response to input 608 and a zoom-out operation in response to input 606. In either instance, FIGS. 6a-6(e) illustrate an instance where any user input having a single point of contact with the screen is interpreted as a pan operation, while any user input having multiple simultaneous points of contact with the screen is interpreted as a bidirectional zoom operation. As such, a user is able to easily perform panning and zooming operations with a single hand.

FIG. 7(a)-(d) illustrate another example manipulation of a graphical representation in response to a user providing inputs in accordance with the frame of reference from FIG. 3. Here, the user scrolls forwards or backwards through a "tunnel" via input towards or away from the focal ring 116. The user also expands or contracts a region of the tunnel via input that is about the focal ring 116.

Figure 7A:
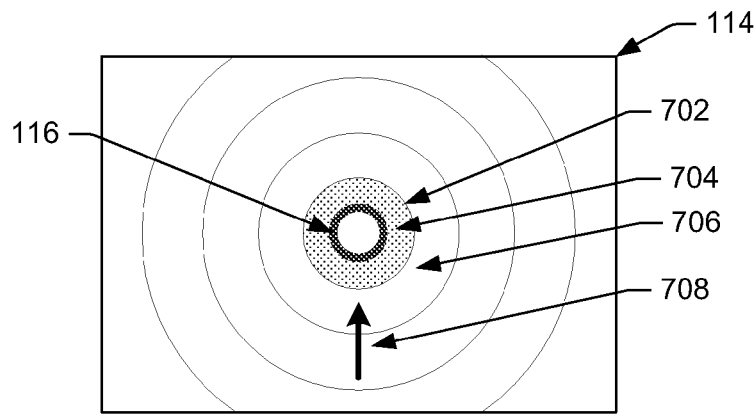
FIGS. 7(a)-(d) illustrate another example manipulation of a graphical representation in response to a user providing inputs in accordance with the frame of reference from FIG. 3. Here, the user scrolls forwards or backwards through a "tunnel" via input towards or away from the focal ring. The user also expands or contracts a region of the tunnel via input that is about the focal ring.

FIG. 7(a) illustrates that the UI 114 includes multiple concentric circles around the focal ring 116 defining multiple concentric regions. For example, FIG. 7(a) illustrates that the focal ring 116 and a circle 702 define a region 704. In some instances, each region may represent a particular interval, such as an interval of time. For instance, each region may represent a particular day, week, month, year, etc. of a user's calendaring application. Each smaller circular region may represent an interval that is "further in" the tunnel and, thus, may represent a proceeding interval of time. Moving the other direction (that is, backwards through the tunnel), the circular regions may move backwards in time. In the example of days, for instance, a region 706 adjacent to region 704 may represent Mar. 1, 2009, while region 704 may represent Mar. 2, 2009.

Figure 7B:
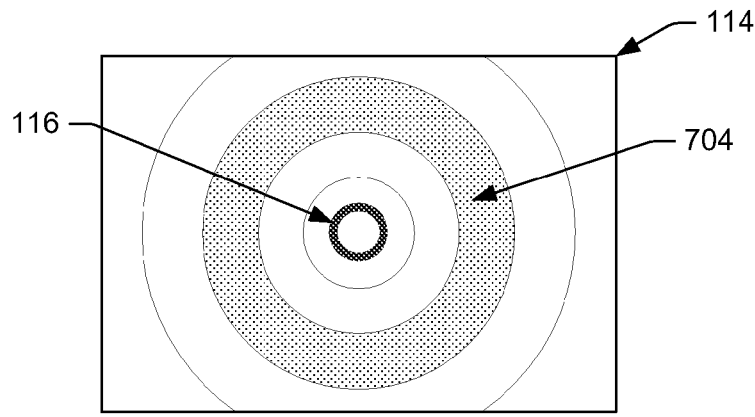

With this context in mind, a user may scroll forwards or backwards through the tunnel in order to navigate through the tunnel. For instance, a user may provide an input 708 that is into the focal ring 116 and/or in a vertical direction. In response, FIG. 7(b) illustrates that the gesture detection functionality 212 manipulates the graphical representation such that the user appears to have moved forwards in the tunnel, as the region 704 has moved backwards in the tunnel from the perspective of the user. Conversely, the user could choose to scroll backwards in the tunnel (in this instance, back in time) by providing an input that is away from the focal ring 116 and/or in a downwards direction.

Figure 7C:
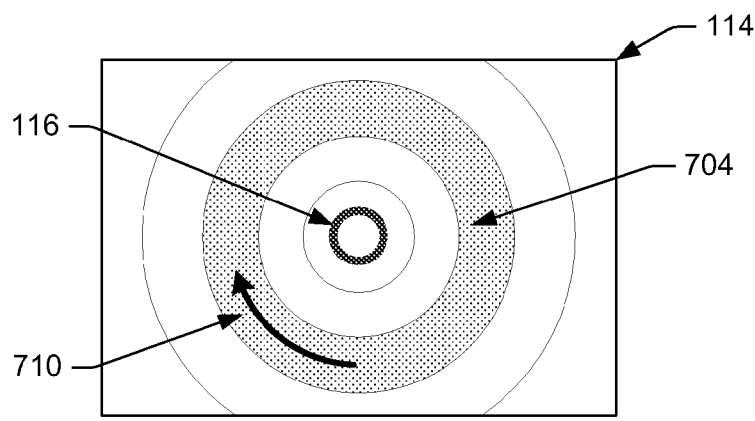
Figure 7D:
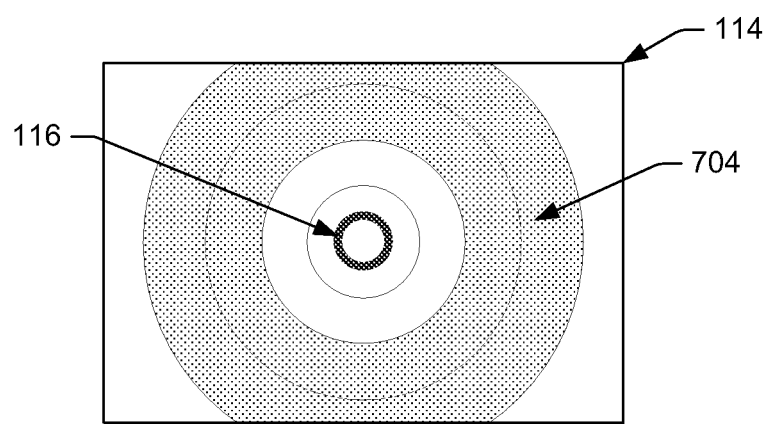

Furthermore, the user may also choose to scale the tunnel by zooming in on or out on one or more selected time intervals, such as the time interval associated with the region 704. FIG. 7(c) illustrates that the user provides an input 710 around the focal ring 116 and FIG. 7(d) illustrates that, in response, the gesture detection functionality 212 has zoomed in on the tunnel by, in part, expanding the region 704. Note also that previously-displayed regions are no longer being displayed due to scale/zoom operation.

Conversely, if a user wished to scale the tunnel downwards, the user could provide an input that is about the focal ring 116 in an opposite direction. In response, the gesture detection functionality 212 may scale the tunnel down by contracting the region 704 and causing adjacent regions to again be displayed. As this example illustrates, user inputs that are towards or away from the focal ring 116 may be interpreted as scrolling operations, while user inputs that are about the focal ring 116 may be interpreted as bidirectional zoom or scaling operations.

Figure 8:
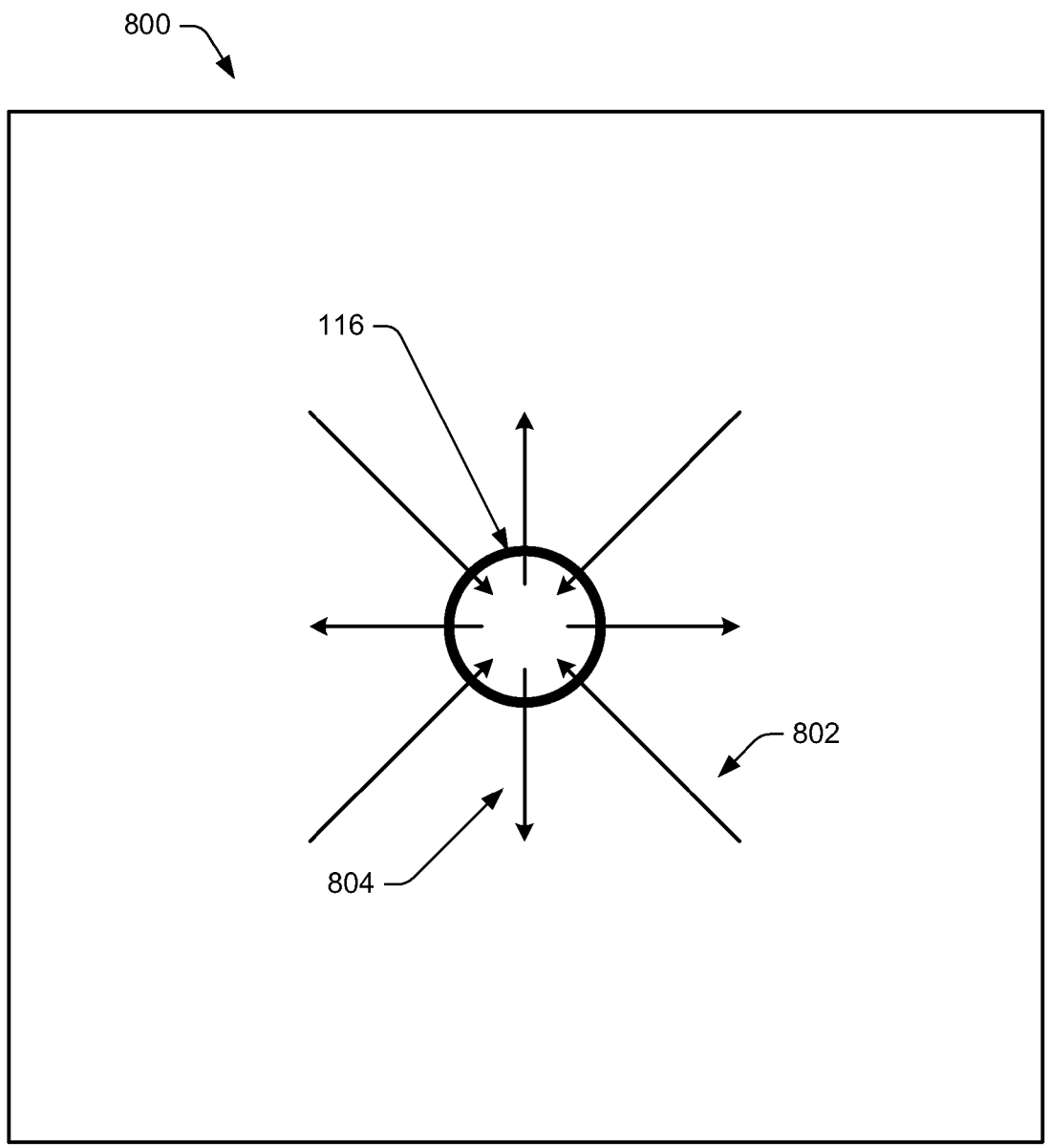
FIG. 8 illustrates a second frame of reference that the focal-control UI may implement facilitating indirect manipulation of the focal ring. Here, a user may provide input that is into the focal ring as well as input that is out of the focal ring.

FIG. 8 illustrates a second frame of reference 800 that the focal-control UI 114 may implement for facilitating indirect manipulation of the focal ring 116. Here, a user may provide input that is into the focal ring 116 (as lines 802 illustrate) as well as input that is out of the focal ring 116 (as lines 804 illustrate). Then, the gesture detection functionality 212 may manipulate a graphical representation based on whether the input is into or out of the focal ring 116.

Figure 9A:
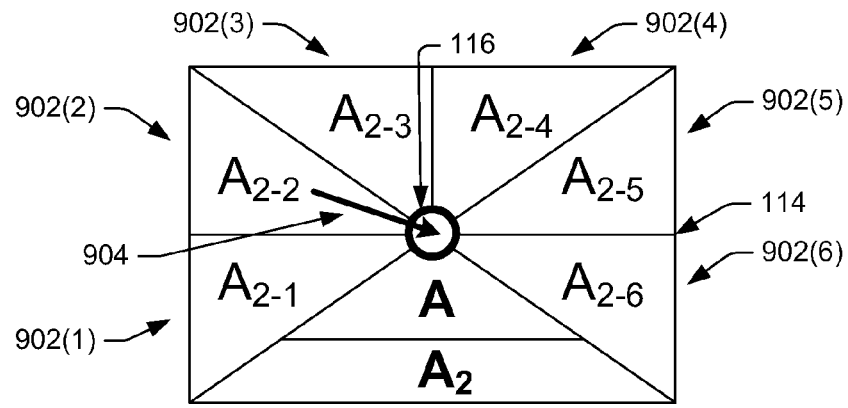
FIGS. 9(a)-(c) illustrate an example manipulation of a graphical representation in response to a user providing inputs in accordance with the frame of reference from FIG. 8.
Figure 9B:
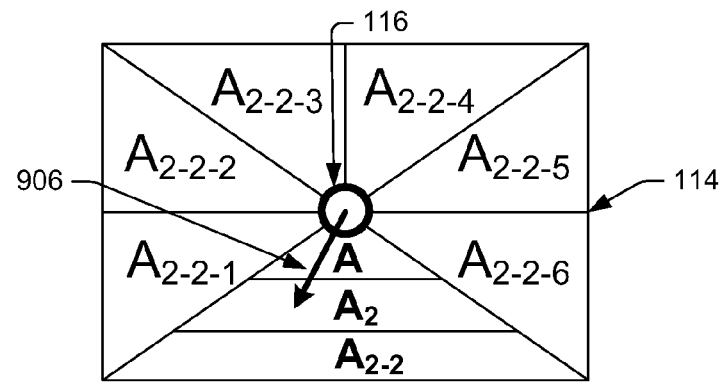
Figure 9C:
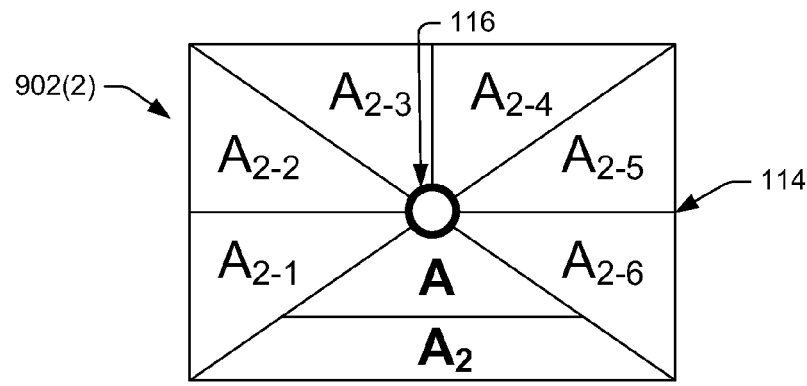

FIG. 9(a)-(c) illustrate an example manipulation of a graphical representation in response to a user providing inputs in accordance with the frame of reference 800 of FIG. 8. FIG. 9(a) illustrates that the focal-control UI 114 includes the focal ring 116 as well as a graphical representation that is broken into multiple regions of content 902(1), 902(2), . . . , 902(7). Some or all of the regions 902(1)-(6) comprise content of a hierarchical tree. More specifically, these regions may display sibling nodes on the hierarchical tree. Furthermore, while FIG. 9(a) illustrates six regions and six sibling nodes, the focal-control UI 114 may break up the graphical representation into the corresponding number of sibling nodes at the relevant location of the hierarchical tree. For example, if the relevant location of the hierarchical tree comprised ten sibling nodes, then the UI 114 may comprise ten regions for these siblings.

Or, some instances, if more siblings exist than can be comfortably displayed or selected (e.g., with a user's finger), one sibling region can represent the remaining siblings. Circular strokes originating from this region can then cycle through all siblings in the remaining sibling regions. For multi-touch, using two points of contact (e.g., two fingers) while circling could have the same effect. In this latter instance, however, the input may originate anywhere on the display rather than simply within a particular region.

The last region 902(7), meanwhile, displays a portion of the hierarchical tree and, more specifically, the parent of the nodes displayed in the regions 902(1)-(6). As such, the nodes displayed in the regions 902(1)-(6) comprise children nodes relative to the parent node illustrated in the region 902(7). In addition to displaying a parent node, the region 902(7) may also display a grandparent node, a great-grandparent node, etc.

Here, the region 902(1) displays a grandparent node ("A") and a parent node ($A_2$, which represents the second child of Node "A"). The regions 902(1)-(6), meanwhile, display the children of parent node $A_2$ ("$A_{2-1}$", "$A_{2-2}$", . . . , "$A_{2-6}$").

The illustrated figure also depicts a user providing an input 904 originating from the region 902(2) and into the focal ring 116. Here, the gesture detection functionality interprets this input as a selection of the node $A_{2-2}$. That is, the input 904 represents that the user is traversing down the hierarchical tree through this particular node that the region 902(2) illustrates.

As such, FIG. 9(b) illustrates that the selected node has been added to the bottom of the region 902(7) (just below this node's parent, node $A_2$). Furthermore, the regions 902(1)-(6) have been filled with the six children of the selected node, $A_{2-2}$. Again, while FIG. 9(b) illustrates six children and six regions, both of these numbers may vary based on a number of children of a selected node.

FIG. 9(b) also illustrates that the user provides an input 906 that originates from within the focal ring 116 and finishes within the region 902(7) (or in some instances. In response, the gesture detection functionality 212 moves (or "pulls") the current parent node (i.e., the previously selected node $A_{2-2}$) from the region 902(7) and places this node and the siblings of this node into the regions 902(1)-(6), as shown in FIG. 9(c). In other words, the user input 906 caused the gesture detection functionality 212 to move upwards in the hierarchical tree and return to the representation of FIG. 9(a). In some instances, input 906 may originate from within focal ring 116 and may finish within any other portion or region of the display in order to cause navigation down the hierarchical tree.

Furthermore, in other instances, the user may alternatively or additionally navigate upwards in the hierarchical tree by providing an input from region 902(7) ("the parent region") and into focal ring 116. Similar to illustrated input 906, such an input would remove the currently-illustrated parent node (here, the previously selected node $A_{2-2}$) from the region 902(7) and would place this node and the siblings of this node into the regions 902(1)-(6), as shown in FIG. 9(c).

As this example of FIGS. 9(a)-(c) illustrates, the frame of reference 800 of FIG. 8 may allow a user to easily and elegantly navigate a hierarchical tree by providing inputs that are into and out of the focal ring 116. For instance, a user may be able to navigate down a hierarchical tree while maintaining continuous contact with the display. It is also noted that while one example has been provided, the frame of reference 800 (as well as each other frame of reference described herein) may be used for multiple other applications and in multiple other contexts.

FIG. 10 illustrates a third frame of reference 1000 that the focal-control UI 114 may implement for facilitating indirect manipulation of the focal ring 116. Here, a user may provide input that is in one or more predefined directions (e.g., horizontal, vertical, diagonal, etc.) relative to the focal ring 116. For instance, the illustrated example comprises a Cartesian grid consisting of horizontal lines 1002 and vertical lines 1004 that are perpendicular to the horizontal lines. When the focal-control UI 114 implements this frame of reference 1000, a user may provide input along a horizontal line or along a vertical line and, in response, the gesture detection functionality 212 manipulates the underlying representation accordingly. Furthermore, functionality 212 may highlight a horizontal or a vertical line as the user provides the input on the particular horizontal or vertical line (e.g., as the user drags her finger across the display).

In some implementations, the functionality 212 may not interpret inputs within a horizontal region 1006 (representing the width of the focal ring 116) and within a vertical region 1008 (also representing the width of the focal ring 116). As such, these regions 1006 and 1008 are considered dead zones that do not accept any user inputs. By providing these dead zones, the focal-control UI 114 avoids the problem of differentiating between a user input along a horizontal line that is just above the center of the focal ring 116 and a user input along a horizontal line that is just below the center of the focal ring 116. In the case of a carousel UI, discussed immediately below, as the carousel is tilted and the height of the carousel decreases, the dead zone may shrink accordingly. Beyond a certain point (e.g. the base carousel element is 0.4× the height of the screen) all left-right horizontal strokes are interpreted as anti-clockwise rotation, and vice versa.

FIG. 11(a)-(f) illustrate an example manipulation of a graphical representation in response to a user providing inputs in accordance with the frame of reference 1000 of FIG. 10. While the illustrated implementation is shown to visibly display the focal ring 116, other implementations may refrain from visibly displaying the ring.

Here, the graphical representation comprises content arranged in a carousel 1102. While this example arranges images (e.g., photographs, etc.) in the carousel 1102, other implementation may arrange any other sort of content (e.g., videos, icons, applications, etc.) or a combination of content. Here, the user rotates a content carousel via a horizontal input and tilts the carousel via a vertical input. Additionally or alternatively, a user could rotate the carousel via single-point-of-contact input (e.g., using one finger) and could tilt the carousel via a multiple-points-of-contact input (e.g., using two fingers) (or vice versa).

As FIG. 11(*a*) illustrates, a user first provides a horizontal input 1104. In response, the gesture detection functionality 212 rotates the carousel 1102 in a counterclockwise direction as FIG. 11(*b*) illustrates. This figure also illustrates that, at this time, the user provides an input 1106 in a vertical direction. In response and as FIG. 11(*c*) illustrates, the functionality 212 tilts the carousel 1102 upwards along an axis passing through the focal ring 116 and the carousel 1102.

FIG. 11(*c*) also illustrates that, at this time, the user provides yet another input 1108 in a vertical direction. FIG. 11(*d*) illustrates that, in response to the input 1108, the gesture detection functionality 212 again tilts the carousel about the axis such that the image in the front of carousel 1102 is enlarged and centered on the user's display. At this time, the user also provides an input 1110 that is along a horizontal line. In response, the carousel 1102 rotates in a corresponding direction and the next image on the carousel 1102 is displayed.

Finally, FIG. 11(*e*) illustrates that the user now provides an input 1112 that is a downwards vertical direction. In response, the gesture detection functionality tilts the carousel 1102 downwards about the axis passing through the focal ring 116 and the carousel 1102 as shown in FIG. 11(*f*). FIGS. 11(*a*)-(*f*) thus illustrate how the frame of reference 1000 of FIG. 10 may be employed to facilitate elegant viewing of collections of content, such as images. For instance, the user may operate the carousel (e.g., rotate, tilt, zoom, etc.) without breaking contact with the display.

Furthermore, the described carousel UI may allow a user to move the carousel with momentum. That is, the user may "spin" the carousel via a first input and then may "catch" the carousel with a second input. This second input or "catch" may be anywhere in the UI in some instance. Once the catch occurs, however, the user can then resume interaction with the carousel from that catch point. Furthermore, it is noted that this momentum concept may be applied to the UIs illustrated in FIGS. 4-5 as well as many other UIs described or enabled throughout.

As discussed above, the carousel 1102 may or may not display a focal ring 116 over the carousel. In some instances, having a focal ring 116 may help to specify a dead zone with regards to user inputs, as discussed with regards to the frame of reference 1000. Furthermore, the focal ring 116 can be used as a handle to, for example, move the carousel onto a large surface. Or, the focal ring can be used as the origin of a radial marking menu.

Also, the focal ring 116 could serve a destination for pieces of content arranged on the carousel 1102. For instance, imagine that the carousel 1102 comprises thumbnails arranged in the carousel around the focal ring 116. Then, dragging a thumbnail into the center would expand the image to fill the whole screen, underneath a floating ring. A circular gesture around the focal ring 116 could then transition the UI into pan-and-zoom mode. Here, a pan-away input at the most zoomed-out level could return the item to the carousel. Similarly, a map UI (e.g., those UIs illustrated in FIGS. 4-5) could contain targets corresponding to carousels of images. After selecting to view these carousels of images, tapping inside the carousel ring could return the user to the map view.

FIG. 12, meanwhile, shows yet another example manipulation that the focal-control UI 114 may enable. Specifically, FIG. 12 shows an example pendulum navigation sequence where a user is able to select a piece of content via inputs that are interpreted relative to the focal ring 116. Once the user has selected a piece of content, the user may expand the piece of content via an input that is also interpreted relative to the focal ring 116.

As illustrated, the focal-control UI 114 here comprises a focal ring 116 consisting of a first region 1202 and a second, interior region 1204. The UI 114 also includes a pendulum 1206 that passes through the center of the focal ring 116. The pendulum 1206 comprises a control 1208 and a content representation 1210. Furthermore, the UI 114 displays a piece of content 1212, such as a browser, an application, an image, or any other subject matter. To begin, the displayed piece of content 1212 is represented as "A" (e.g., a browser, an image, etc.). Whatever the content, the content representation 1210 may or may not also display the content 1212. As illustrated, a user provides an input 1214 moving the control 1208—and, hence, swinging the pendulum 1206—about the focal ring 116.

In response, the gesture detection functionality 212 moves the content 1212 to an opposite side of the display. The piece of content 1212 also changes responsive to the move. As illustrated, piece of content 1212 now becomes content "B", representing some content that is different than A (e.g. a different application, image, etc.). If the user were to swing the pendulum 1206 back to its original position, then the piece of content 1212 would similarly return to its original position and would similarly return to illustrating content "A". As illustrated, however, the user next provides an input 1216 moving the control 1208 towards the first region 1202 of the focal ring 116. In response, the control 1208 moves towards the center of the focal ring 116 and the content representation 1210 begins to expand.

Furthermore, the user again provides an input 1218 that is towards the center of the focal ring 116 and, more specifically, towards the second, interior region 1204. During the input, the content representation 1210 may continue to expand until the input reaches the center of the focal ring 116. At this point, the content representation 1210 expands to cover the entire top portion of the display. If the content representation 1210 did not previously display the content 1212, then it may do so at this point.

As discussed above, FIG. 12 illustrates a pendulum interface that interprets user inputs with use of frame of reference 300 (interpreting inputs that are about or into focal ring 116). However, in other instances, a pendulum interface could use frame of reference 1000 (interpreting inputs that are in pre-defined directions relative to focal ring 116, such as vertical and horizontal inputs). In these instances, horizontal strokes at the base of the screen could cause pendulum rotation about the focal ring axis. Although the arc swept by the pendulum would be less than 180 degrees, upwards strokes from any location could immediately cause the selected item to expand. Transitions from horizontal to vertical may be simpler than those transitions from around the ring to through the ring, as FIG. 12 illustrates. Furthermore, in a UI that implements frame of reference 300, the central horizon can be crossed in any location.

FIG. 13 illustrates yet another example pendulum navigation sequence where a user is able to select a piece of content via inputs that are interpreted relative to the focal ring 116.

Once the user has selected a piece of content, the user may again expand the piece of content via an input that is also interpreted relative to the focal ring 116.

As illustrated, the focal-control UI 114 here comprises a focal ring 116 as well as regions 1302(1), 1302(2), 1302(3), and 1302(4). As illustrated, each of regions 1302(1), (2) and (4) include multiple pieces of content. When a user provides an input in one of regions 1302(1)-(4), the base of the pendulum will appear in the selected region and the user will be able to navigate the content in the region that is opposite the base of the pendulum.

In the illustrated example, the base of pendulum 1206 begins in region 1302(3). In this particular location, the user has selected a piece of content 1304 opposite region 1302(3) in region 1302(3). At this point, the user also provides an input 1306 along a horizontal line relative to focal control 116. In response and as illustrated, the base of the pendulum moves with the input and a new piece of content 1308 is accordingly selected At this point, the user also provides an input 1310 that is in a vertical direction. In response, selected piece of content 1308 begins to expand. In some instances, piece of content 1308 may continue to expand until the content fills all or substantially all of UI 114. Furthermore, if the user chooses to move the pendulum to region 1302(2), then the user may peruse content in region 1302(4) via vertical inputs. Additionally, the user may expand selected content in region 1302(4) via horizontal inputs.

Operation

FIG. 14 is a flow diagram illustrating a process 1400 for facilitating manipulation of a graphical representation via indirect manipulation of a focal control. The process 1400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

At 1402, a focal-control user interface 114 is presented with a graphical representation and a focal control, such as a focal ring 116. The graphical representation may comprise a browser, an application, a photograph, a map, or any other content, as discussed above. Next, at 1404, the process 1400 enables a user to manipulate the graphical representation via indirect manipulation of the focal control. For instance, the process 1400 may enable a user to provide inputs (e.g., via a peripheral device, a touch screen, or otherwise) relative to the focal control and, in response, manipulate the underlying graphical representation. Any of the frames of reference described above may be used, as well as any similar or different frames of reference.

Next, 1406 queries whether a user input is received. If not, the process 1400 continues to wait for a user input. This user input may include, for instance, an input that is towards or away from the focal control, about the focal control, into or out of the focal control, or in a predefined direction relative to the focal control. Finally, if a user input is detected, then the graphical representation is manipulated according to the received input at 1408. The process 1400 may then return to 1406 to continue querying for user input relative to the focal control.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user interface comprising:
   a display;
   a representation area to display a graphical representation;
   a focal control disposed within the representation area and fixed at a predetermined position within the representation area;
   a gesture detection functionality to:
      detect a location of an input from a user relative to the focal control, wherein the focal control is visible prior to the detection of the input from the user and after the detection of the input from the user;
      detect an input of the user that is into the focal control, and in response to detecting the input of the user that is into the focal control, manipulate the graphical representation in a first manner; and
      detect an input of the user that is out of the focal control, and in response to detecting the input of the user that is out of the focal control, manipulate the graphical representation in a second manner that is different from the first manner; and
   a manipulation functionality to, responsive to detecting the location of the input from the user, manipulate the graphical representation based, at least in part, on the location of the input from the user relative to the focal control, wherein:
      the graphical representation comprises multiple regions that each display respective content of a hierarchy;
      the input of the user into the focal control originates from a first region of the multiple regions; and
      the manipulation of the graphical representation in the first manner comprises causing display of one or more children in the hierarchy of the content in the first region, the one or more children being displayed in respective regions of the multiple regions.

2. The user interface as recited in claim 1, wherein the focal control comprises a circular, oval, or polygonal ring that is displayed over the graphical representation.

3. The user interface as recited in claim 1, wherein the focal control is approximately centrally located in the representation area.

4. The user interface as recited in claim 1, wherein the gesture detection functionality is further to:
   detect an input of the user that is about the focal control without contact thereto, and in response to detecting the input of the user that is about the focal control, manipulate the graphical representation in a third manner; and
   detect an input of the user that is towards or away from the focal control, and in response to detecting the input of the user that is towards or away from the focal control, manipulate the graphical representation in a fourth manner that is different from the third manner.

5. The user interface as recited in claim 4, wherein:
   the manipulation of the graphical representation in the third manner comprises zooming in or out on the graphical representation; and
   the manipulation of the graphical representation in the fourth manner comprises panning the graphical representation.

6. The user interface as recited in claim 4, wherein the graphical representation comprises a series of concentric circles defining respective concentric regions between the concentric circles, and wherein:
the manipulation of the graphical representation in the third manner comprises expanding or contracting a concentric region within which the input of the user is received; and
the manipulation of the graphical representation in the fourth manner comprises scrolling the respective concentric regions towards an innermost concentric region or towards an outermost concentric region.

7. The user interface as recited in claim 1, wherein:
a second region of the multiple regions displaying a parent in the hierarchy before the input of the user out of the focal control; and
the manipulation of the graphical representation in the fourth manner comprises causing display of: (i) the parent in the hierarchy of the content in the second region, and (ii) one or more siblings of the parent in the hierarchy, the parent and the one or more siblings being displayed in corresponding regions of the multiple regions other than the second region.

8. The user interface as recited in claim 1, wherein the gesture detection functionality is further to:
detect an input of the user that is in a first predefined direction relative to the focal control, and in response to detecting the input of the user that is in the first predefined direction, manipulate the graphical representation in a third manner; and
detect an input of the user that is in a second predefined direction that is substantially perpendicular to the first predefined direction, and in response to detecting the input of the user that is in the second predefined direction, manipulate the graphical representation in a fourth manner that is different from the third manner.

9. The user interface as recited in claim 8, wherein:
the graphical representation comprises content arranged in a carousel;
the manipulation of the graphical representation in the third manner comprises rotating the carousel in a clockwise or counterclockwise direction; and
the manipulation of the graphical representation in the fourth manner comprises tilting the carousel about an axis that passes through the carousel.

10. The user interface as recited in claim 1, wherein the input of the user is received via a peripheral device or via a touch-screen display.

11. The user interface as recited in claim 1, wherein the input of the user comprises a touch input that is received via a touch-screen display, and
wherein the gesture detection functionality is further to:
detect a touch input having a single point of contact, and in response to detecting the touch input having the single point of contact, manipulate the graphical representation in a third manner; and
detect a touch input having multiple points of contact, and in response to detecting the touch input having the multiple points of contact, manipulate the graphical representation in a fourth manner that is different from the third manner.

12. The user interface as recited in claim 11, wherein:
the manipulation of the graphical representation in one of the third manner or the fourth manner comprises zooming in or out on the graphical representation; and
the manipulation of the graphical representation in the other of the third manner or the fourth manner comprises panning the graphical representation.

13. A method comprising:
presenting a user interface with a representation area to display a graphical representation and a focal control having a constant size within the representation area, the focal control comprising a ring, wherein the ring serves as a reference point to translate a meaning of one or more gestures occurring within the representation area;
presenting the focal control in the representation area prior to and after receiving the one or more gestures; and
receiving a manipulation from a user to manipulate the graphical representation by indirectly manipulating the focal control, the indirect manipulation comprising input from the user that is towards or away from the focal control, about the focal control, into or out of the focal control or in a predefined direction relative to the focal control, wherein:
the graphical representation comprises multiple regions that each display respective content of a hierarchy; and
in response to receiving an input of the user into the focal control that originates from a first region of the multiple regions, the manipulation of the graphical representation comprises causing display of one or more children in the hierarchy of the content in the first region, the one or more children being displayed in respective regions of the multiple regions.

14. The method as recited in claim 13, wherein:
the graphical representation comprises multiple concentric rings defining multiple concentric regions there between;
the indirect manipulation comprises input from the user that towards, away from, or about the focal control; and
the manipulation of the graphical representation comprises:
scrolling through the multiple concentric regions in response to receiving an input that is towards or away from the focal control; and
expanding or contracting a respective concentric region in response to receiving an input that is about the focal control.

15. The method as recited in claim 13, wherein:
the indirect manipulation comprises input from the user that is towards or about the focal control; and
the manipulation of the graphical representation comprises panning the graphical representation in response to receiving an input that is towards the focal control and zooming in or out on the graphical representation in response to receiving an input that is about the focal control.

16. The method as recited in claim 13, wherein:
the indirect manipulation comprises input from the user that is into or out of the focal control; and
the manipulation of the graphical representation comprises navigating downwards through a hierarchical tree in response to receiving an input into the focal control and navigating upwards through the hierarchical tree in response to receiving an input out of the focal control.

17. The method as recited in claim 13, wherein:
the graphical representation comprises content arranged in a carousel;
the indirect manipulation comprises input from the user that is in a predefined direction relative to the focal control; and the manipulation of the graphical representation comprises:
  rotating the carousel about the focal control in response to receiving an input that is in a first predefined direction relative to the focal control; and
  tilting the carousel about an axis that passes through the carousel in response to receiving an input that is in a second predefined direction relative to the focal control, the second predefined direction being substantially perpendicular to the first predefined direction.

18. One or more memory devices storing computer-executable instructions that, when executed, instruct one or more processors to perform acts comprising:
  presenting a user interface with a representation area to display a graphical representation and a focal control having a constant size within the representation area, the focal control comprising a ring, wherein the ring serves as a reference point to translate a meaning of one or more gestures occurring within the representation area;
  presenting the focal control in the representation area prior to and after receiving the one or more gestures; and
  receiving a manipulation from a user to manipulate the graphical representation by indirectly manipulating the focal control, the indirect manipulation comprising input from the user that is towards or away from the focal control, about the focal control, into or out of the focal control or in a predefined direction relative to the focal control, wherein:
  the graphical representation comprises multiple regions that each display respective content of a hierarchy; and
  in response to receiving an input of the user into the focal control that originates from a first region of the multiple regions, the manipulation of the graphical representation comprises causing display of one or more children in the hierarchy of the content in the first region, the one or more children being displayed in respective regions of the multiple regions.

* * * * *